United States Patent
Gonzalez

(10) Patent No.: US 11,510,259 B2
(45) Date of Patent: *Nov. 22, 2022

(54) DIRECTIONALLY ORIENTED WIRELESS VOICE COMMUNICATION WITH OPTIONAL TELEPHONY OR NETWORK HANDOFF

(71) Applicant: Encarnacion Gonzalez, Alice, TX (US)

(72) Inventor: Encarnacion Gonzalez, Alice, TX (US)

( * ) Notice: Subject to any disclaimer, the term of this patent is extended or adjusted under 35 U.S.C. 154(b) by 142 days.

This patent is subject to a terminal disclaimer.

(21) Appl. No.: 17/137,631

(22) Filed: Dec. 30, 2020

(65) Prior Publication Data

US 2021/0120606 A1    Apr. 22, 2021

Related U.S. Application Data

(63) Continuation-in-part of application No. 16/355,722, filed on Mar. 16, 2019, now abandoned, which is a continuation-in-part of application No. 16/283,792, filed on Feb. 24, 2019, now abandoned.

(60) Provisional application No. 62/774,538, filed on Dec. 3, 2018.

(51) Int. Cl.
*H04W 76/14* (2018.01)
*H04W 72/04* (2009.01)
*H04W 76/11* (2018.01)

(52) U.S. Cl.
CPC ......... *H04W 76/14* (2018.02); *H04W 72/046* (2013.01); *H04W 76/11* (2018.02)

(58) Field of Classification Search
None
See application file for complete search history.

(56) References Cited

U.S. PATENT DOCUMENTS

| 2006/0004627 | A1* | 1/2006 | Baluja | H04L 41/0806 |
| | | | | 705/14.4 |
| 2013/0225223 | A1* | 8/2013 | Nukala | H04W 52/265 |
| | | | | 455/522 |
| 2015/0181548 | A1* | 6/2015 | Varoglu | H04W 4/33 |
| | | | | 455/456.2 |
| 2016/0014722 | A1* | 1/2016 | Yoon | H04M 1/72412 |
| | | | | 455/552.1 |
| 2016/0054560 | A1* | 2/2016 | Alkouby | H04N 5/2254 |
| | | | | 348/79 |
| 2016/0087976 | A1* | 3/2016 | Kaplan | H04L 63/0823 |
| | | | | 713/156 |
| 2016/0364723 | A1* | 12/2016 | Reese | G06Q 20/38215 |
| 2021/0235491 | A1* | 7/2021 | Iyer | H04W 72/042 |

* cited by examiner

*Primary Examiner* — Xavier S Wong
(74) *Attorney, Agent, or Firm* — William Lovin & Associates LLC; William R. Lovin

(57) ABSTRACT

A cellular telephone or similar wireless device possesses a directionally oriented wireless telecommunications facility to initiate and operate a second type of wireless connection. Optionally, the devices share mobile identification numbers (MINs), IP addresses, or MAC addresses. Also optionally, the devices create contacts in their contact databases reflecting the identity of the connection. By this means, a subsequent telephony-based or LAN-based connection may be instituted.

26 Claims, 6 Drawing Sheets

DIRECTIONALLY ORIENTED WIRELESS VOICE COMMUNICATION WITH OPTIONAL TELEPHONY OR NETWORK HANDOFF

CROSS-REFERENCE TO RELATED APPLICATIONS

This application takes benefit of U.S. patent application Ser. No. 16/355,722 filed Mar. 16, 2019 which is included in its entirety by reference. That application takes benefit of U.S. patent application Ser. No. 16/283,792 filed Feb. 24, 2019 which is also included in its entirety by reference. That application takes benefit of U.S. Prov. Pat. No. 62/774,538 filed Dec. 3, 2018 which is also included in its entirety by reference.

FIELD OF THE INVENTION

A cellular telephone or a similar wireless device that possesses a directionally oriented wireless or infrared telecommunications facility to initiate and operate an omnidirectional wireless connection. Optionally, the devices share mobile identification numbers (MINs), Internet protocol (IP) addresses, media access control (MAC) addresses, or other identifying information. Also optionally the devices create contacts in their contact databases reflecting the identity of the device that is connected. By this means, a subsequent telephony- or internet-based connection with the same device may be instituted. In one embodiment, a wireless cellular telephone having the hardware and software capabilities to transmit and detect infrared beams as the initial initiator of wireless signals is presented. Specifically, a cellular telephone, or a similar wireless device, that possesses a directionally oriented communications facility that does not require the use of a local area network to initiate and operate a wireless connection. Said cellular telephone, or similar wireless device possesses, and or has, the ability to create and transmit a focused infrared beam to initially communicate with other wireless devices and computer servers by pointing, or directing, said cellular telephone at the terminating device to directionally transmit a focused infrared beam at the terminating device. The user of the terminating device has the option to accept the requested connection or not. If the user of terminating device accepts the initial request to connect, both wireless devices switch to RF-based wireless communication by means of their omnidirectional antennas.

BACKGROUND OF THE INVENTION

The invention relates to wireless communications devices, particularly to cellular telephones, that possess a directionally oriented telecommunications facility that it initially uses to initiate, and optionally share after initiation, the telephone number or device identity, with the other device. The invention relates to wireless communications devices particularly to cellular telephones, that possess a directionally oriented telecommunications facility that does not initially require the use of a local area or wide area network. The insinuating cellular telephone and terminating device have the hardware and software capabilities to generate, transmit, and detect directional beams of RF and infrared radiation allowing an initial wireless connection with terminating devices without knowledge of the terminating device's MIN, IP address, or MAC address.

In the prior art, no alternative method of instituting wireless communication with a nearby cellular telephone, or other wireless device, by means of directional designation (pointing) are known. By this means local area and wide area wireless communication with a specific wireless device may be instituted.

Similarly, no alternative method of sharing, after the initial wireless connection is made, the telephone number or device identity of the insinuating device with the terminating device is known. By this means a local area or a wide area telephonic communications link may later be created between the two devices.

SUMMARY OF THE INVENTION

In a first embodiment of the present invention, a directionally oriented wireless communication link by means of a directionally oriented wireless telecommunications facility is used to authenticate and subsequently institute an omnidirectionally oriented wireless communication link by means of an omnidirectionally oriented wireless communications facility. The directionally oriented and the omnidirectionally oriented wireless communications links ordinarily occur using different types of wireless technologies. For example, the directionally oriented wireless communications facility may be infrared radiation based and the omnidirectionally oriented wireless communications facility may be RF cellular telephony based. In a first embodiment of the present invention, a directionally oriented wireless telecommunications facility is used to create a bidirectional communications link from one wireless device to another wireless device. The bidirectional communication link is directionally oriented. That is to say that the bidirectional communications link is aligned in a uniform direction between two points.

The bidirectional communications link may be used to transmit voice, text, or data. The bidirectional communications link establishes immediate wireless communication between the insinuating wireless device and a terminating wireless device using wireless technology and protocols including, but not limited to: Bluetooth; Wi-Fi; infrared radiation; radio waves; radio wireless technology; electromagnetic wireless technology; mobile broadband technology; and microwave radiation.

The bidirectional communications link requires a directional transmitting device to insinuate a connection sequence. The user manually points the insinuating device at the terminating device and directionally transmits a connection request. In one embodiment of the present invention, the terminating wireless device communicates back via Bluetooth; Wi-Fi; infrared radiation; radio waves; radio wireless technology; electromagnetic wireless technology; mobile broadband technology; or microwave radiation using an omnidirectional antenna. At this point, the insinuating wireless device switches to an omnidirectional antenna to continue communication with the terminating wireless device. Alternately, the insinuating wireless device may be required to continue communication using the directional antenna. Also, the insinuating device and the terminating device may be required to change to a different mode of communication, i.e., selected from Bluetooth; Wi-Fi; infrared radiation; radio waves; radio wireless technology; electromagnetic wireless technology; mobile broadband technology; or microwave radiation.

The system works in the following manner: The insinuating wireless device is manually pointed so that its physical long axis and the longitudinally oriented long axis of its wireless field is directed towards the terminating wireless device. Using its directional transmitting device, oriented so that it emits radiation collinear with the physical long axis of the device, the insinuating wireless device transmits a connection invitation request to the intended terminating wireless device. Assuming the terminating wireless device allows connection invitations to be received, the terminating wireless device may, or may not, institute a connection with the insinuating wireless device. Whether the terminating wireless device allows connection invitations to be received or does not is governed in one embodiment of the present invention by the user of the terminating wireless device, if any. If there is a user, the user of the terminating wireless device is queried by a screen on the device advising them that an insinuating wireless device is attempting to make a connection. If the user of the terminating wireless device selects not to create a connection with the insinuating wireless device, the terminating wireless device communicates back a negative response using an omnidirectional antenna and the insinuating wireless device shows a screen to its user indicating that the user of the terminating wireless device does not desire that the requested connection be made. On the other hand, if the user of the terminating wireless device selects to create a connection with the insinuating wireless device, the terminating wireless device communicates back a positive response using an omnidirectional antenna and the insinuating wireless device may show a screen to its user indicating that the user of the terminating wireless device desires that the requested connection be made. Two-way communication between the insinuating wireless device and the terminating wireless device begins with both devices using an omnidirectional antenna. If there is no user, the terminating device queries a database to determine if the insinuating device is allowed to connect to it. If it is allowed, an acceptance of the request is sent back to the insinuating device using an omnidirectional antenna. If it is not allowed to make a connection, a denial of the request is sent back to the insinuating device using an omnidirectional antenna.

After this, the insinuating wireless device or the terminating wireless device may, or may not, request that the insinuating wireless device and the terminating wireless device exchange mobile identification numbers (MINs). The MIN is a number that uniquely identifies a mobile phone working under TIA standards for cellular and PCS technologies (e.g., EIA/TIA-553 analog, IS-136 TDMA, IS-95, or IS-2000 CDMA). It may also be referred to as the MSID (Mobile Station ID) or IMSI_S (Short IMSI). Similarly, the insinuating wireless device or the terminating wireless device may, or may not, request that the insinuating wireless device and the terminating wireless device exchange IP addresses or MAC addresses.

If the insinuating wireless device and the terminating wireless device agree to exchange MINs or IP or MAC addresses, they do so. One, or both, of the insinuating wireless device and the terminating wireless device may create contact records in associated contact databases reflecting the identity of the party with whom the connection has just been negotiated.

It will be obvious that any kind of wireless communication may occur at this point. Voice over internet protocol (VoIP) voice communication is preferred, but short message service (SMS) text messages, multimedia messaging service (MMS) messages, etc. may be initiated and may occur. Similarly, any type of data transmission (HTML, FTP, etc.) may occur.

If the insinuating and the terminating wireless device have exchanged MINs, it will be possible for the two devices to communicate using a standard cellular network. In this mode, the initiator accesses the MIN that was received after the initial connection was completed and attempts to connect to it using the cellular network. Similarly, if the insinuating and the terminating wireless device have exchanged IP addresses or MAC addresses, it will be possible for the two devices to communicate using a standard IP network. In this mode, the initiator accesses the IP address or MAC address that was received after the identifying connection was completed and attempts to connect to it using the IP network.

Similarly, if the insinuating and the terminating wireless devices have created contact records in their respective contact databases, it will also be possible for the two devices to communicate using a standard cellular network. In this mode, the initiator accesses the contact record containing the MIN that was received after the initial connection was completed and attempts to connect to it using the cellular network. Similarly, if the insinuating and the terminating wireless device have been connected using an IP network, that connection may be reestablished.

DETAILED DESCRIPTION OF THE INVENTION

Figure 1:
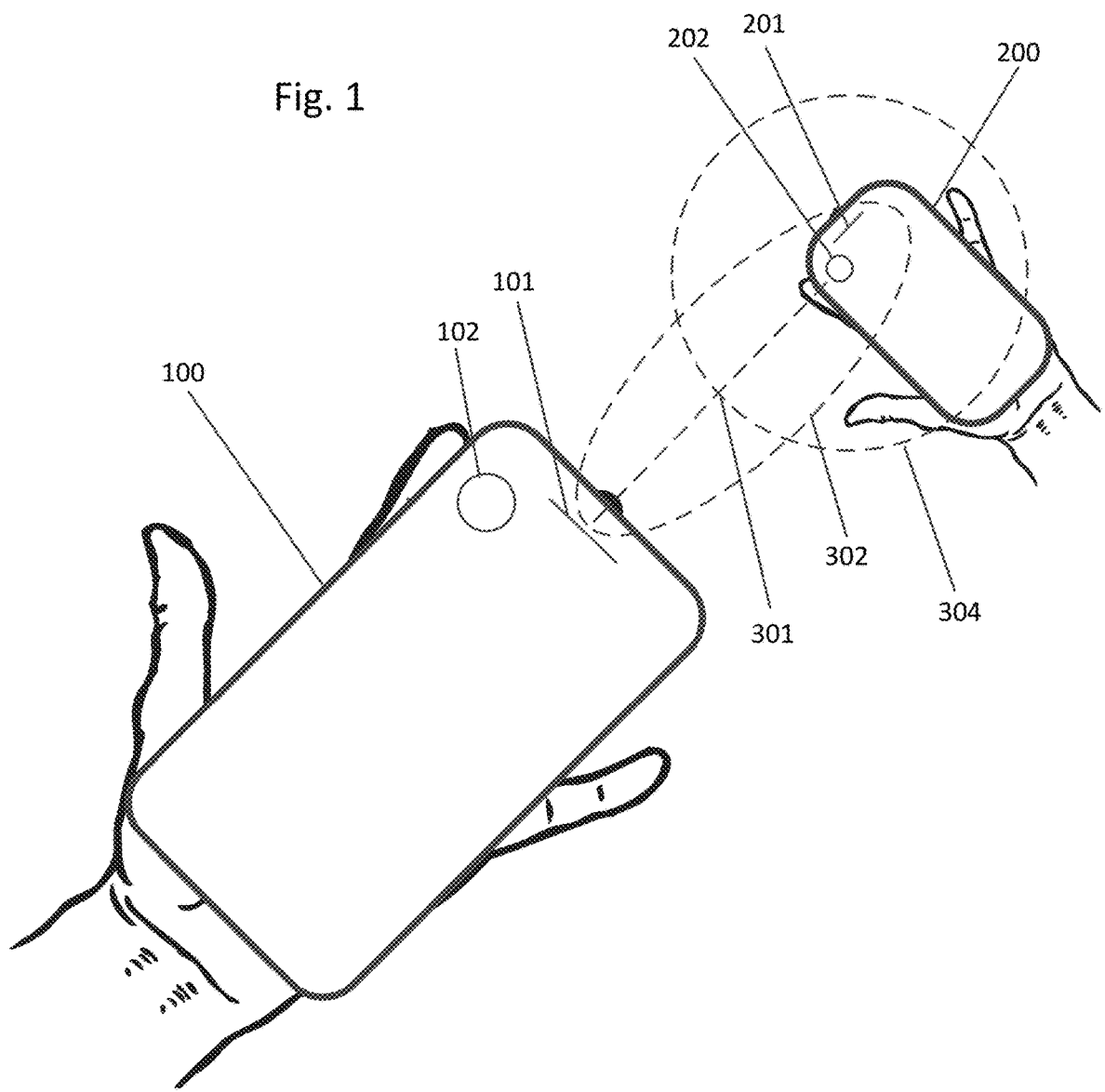
FIG. 1 is a view of an insinuating wireless device and how it is oriented or pointed when attempting to solicit a connection from a terminating wireless device using a directional transmitting device.

Turning now to FIG. 1, in one embodiment of the present invention, a directionally oriented wireless telecommunications facility is used to create bidirectional communication link 301 (the first wireless service) from an insinuating wireless device 100 to a terminating wireless device 200.

Bidirectional communication link 301 (the first wireless service) directionally orients its RF or infrared field 302 from the forward leading edge of insinuating wireless device 100. That is to say, that the long axis of insinuating wireless device 100 is collinear with bidirectional communication link 301 (the first wireless service) along which directionally oriented RF or infrared field 302 is created and transmitted by means of directional transmission facility 101. Those having skill in the art will, of course, recognize that any other axis of the insinuating wireless device (e.g., the transverse and rear axes) 100 may also be the axis along which directional transmission facility 101 is aligned. Those having skill in the art will recognize that the insinuating wireless device may be manually pointed such that the direction along which directional transmission facility 101 is aligned is directed towards the terminating wireless device 200.

Those having skill in the art will recognize that directional transmission facility 101 may be of any construction, including but not limited to: a directional micro strip antenna, a Yagi antenna, a parabolic antenna, or a directional infrared emitter.

In the first phase of the connection sequence, insinuating wireless device 100 creates an RF or infrared field 302 using a first wireless service generally oriented along bidirectional communication link 301 (the first wireless service). Those having skill in the art will recognize that bidirectional communication link 301 (the first wireless service) may be in any form, including but not limited to local area wireless technologies such as Bluetooth, Wi-Fi, WiMAX, WAP 2.0, iBurst, Flash-OFDM, infrared radiation, radio waves, radio wireless technology, electromagnetic wireless technology, mobile broadband technology such as LTE, EDGE Evolution, UMTS, EV-DO, and microwave radiation. The first wireless service and the second wireless service may be different types of wireless service. Insinuating wireless device 100 continually transmits a connection request through RF or infrared field 302 oriented along bidirectional communication link 301 (the first wireless service). Potential terminating wireless device 200 receives the connection request by means of omnidirectional antenna 202 possessing omnidirectional field 304, and, under the direction of its user, if any, transmits an acceptance of the connection request. This acceptance of the connection request is received by directional transmission facility 101 of insinuating wireless device 100. Those having skill in the art will recognize that, alternately, omnidirectional antenna 102 may be used to receive the acceptance of the connection request.

Figure 2:
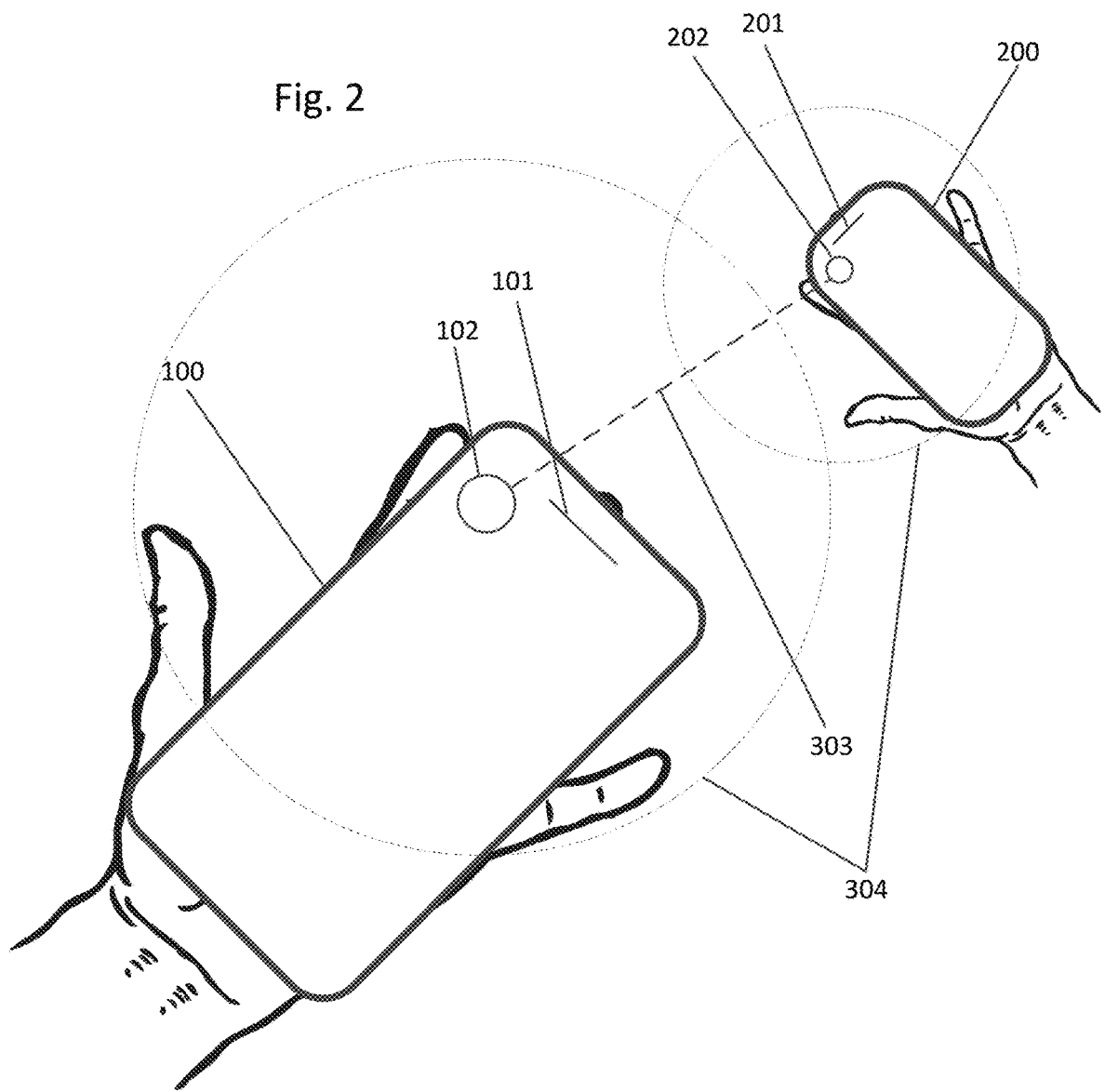
FIG. 2 is a view of an insinuating wireless device and a terminating wireless device after the connection has been created and the insinuating wireless device switches to an omnidirectional antenna after a connection is created between the insinuating wireless device and the terminating wireless device.

Referring now to FIG. 2, in the second phase of the connection sequence, insinuating wireless device 100 switches to its omnidirectional antenna 102 and institutes bidirectional wireless connection 303 (the second wireless service) with terminating wireless device 200 by means of its omnidirectional antenna 202. Those having skill in the art will recognize that, alternately, omnidirectional antenna 102 may already have been used to receive the acceptance of the connection request and that the switch may have already been performed.

Those having skill in the art will recognize that bidirectional wireless connection 303 (the second wireless service) may be in any form, including but not limited to local area wireless technologies such as Bluetooth, Wi-Fi, WiMAX, WAP 2.0, iBurst, Flash-OFDM, infrared radiation, radio waves, radio wireless technology, electromagnetic wireless technology, mobile broadband technology such as LTE, EDGE Evolution, UMTS, EV-DO, and microwave radiation. The first wireless service and the second wireless service may be different types of wireless service. Those having skill in the art will recognize that in one embodiment of the present invention that bidirectional wireless connection 303 (the second wireless service) is point-to-point. Similarly, those having skill in the art will recognize that in another embodiment of the present invention that bidirectional wireless connection 303 (the second wireless service) may be relayed through an access point.

In one embodiment of the present invention, bidirectional wireless connection 303 (the second wireless service) establishes communication between an insinuating wireless device 100 such as a cellular telephone and a terminating wireless device 200 such as another cellular telephone. Bidirectional wireless connection 303 (the second wireless service) may be used to transmit voice, text, or data and this transmission occurs without the use of the cellular telephone network.

After bidirectional wireless connection 303 (the second wireless service) has been instituted, insinuating wireless device 100 such as a cellular telephone and terminating wireless device 200 such as another cellular telephone may, or may not, request that the insinuating wireless device 100 and the terminating wireless device 200 exchange mobile identification numbers (MINs). The MIN is an identifier that uniquely identifies a mobile phone working under TIA standards for cellular and PCS technologies (e.g., EIA/TIA-553 analog, IS-136 TDMA, IS-95, or IS-2000 CDMA). It may also be referred to as the MSID (Mobile Station ID) or IMSI_S (Short IMSI). Similarly, insinuating wireless device 100 such as an insinuating cellular telephone and terminating wireless device 200 such as a terminating cellular telephone may, or may not, request that the insinuating wireless device 100 and the terminating wireless device 200 exchange IP addresses or MAC addresses. Those having skill in the art will recognize that these are not the only identifiers that may be exchanged and that all such identifiers are included by reference.

If the insinuating wireless device 100 and the terminating wireless device 200 agree to exchange MINs, they do so. One, or both, of the insinuating wireless device 100 and the terminating wireless device 200 may then create contacts reflecting the identity of the party with whom bidirectional wireless connection 303 (the second wireless service) has just been negotiated. If the insinuating wireless device 100 and the terminating wireless device 200 agree to exchange IP or MAC addresses, they also do so. One, or both, of the insinuating wireless device 100 and the terminating wireless device 200 may then create contacts reflecting the identity of the party with whom bidirectional wireless connection 303 (the second wireless service) has just been negotiated.

It will be obvious that any kind of wireless communication may occur at this point. VoIP voice communication is preferred, but short message service (SMS) text messages, multimedia messaging service (MMS) messages, etc. may be initiated and may occur. Similarly, other data communications such as FTP and HTML may also occur.

If the insinuating wireless device 100 and the terminating wireless device 200 have exchanged MINs, it will be possible for the two devices to communicate using a standard cellular network. In this mode, the initiator accesses the MIN that was received after bidirectional wireless connection 303 (the second wireless service) was completed and attempts to connect to it using the cellular network. Similarly, if the insinuating wireless device 100 and the terminating wireless device 200 have exchanged IP or MAC addresses, it will be possible for the two devices to communicate using a standard IP network. In this mode, the initiator accesses the IP or MAC address that was received after bidirectional wireless connection 303 (the second wireless service) was completed and reestablishes the connection via the IP network.

Figure 3:
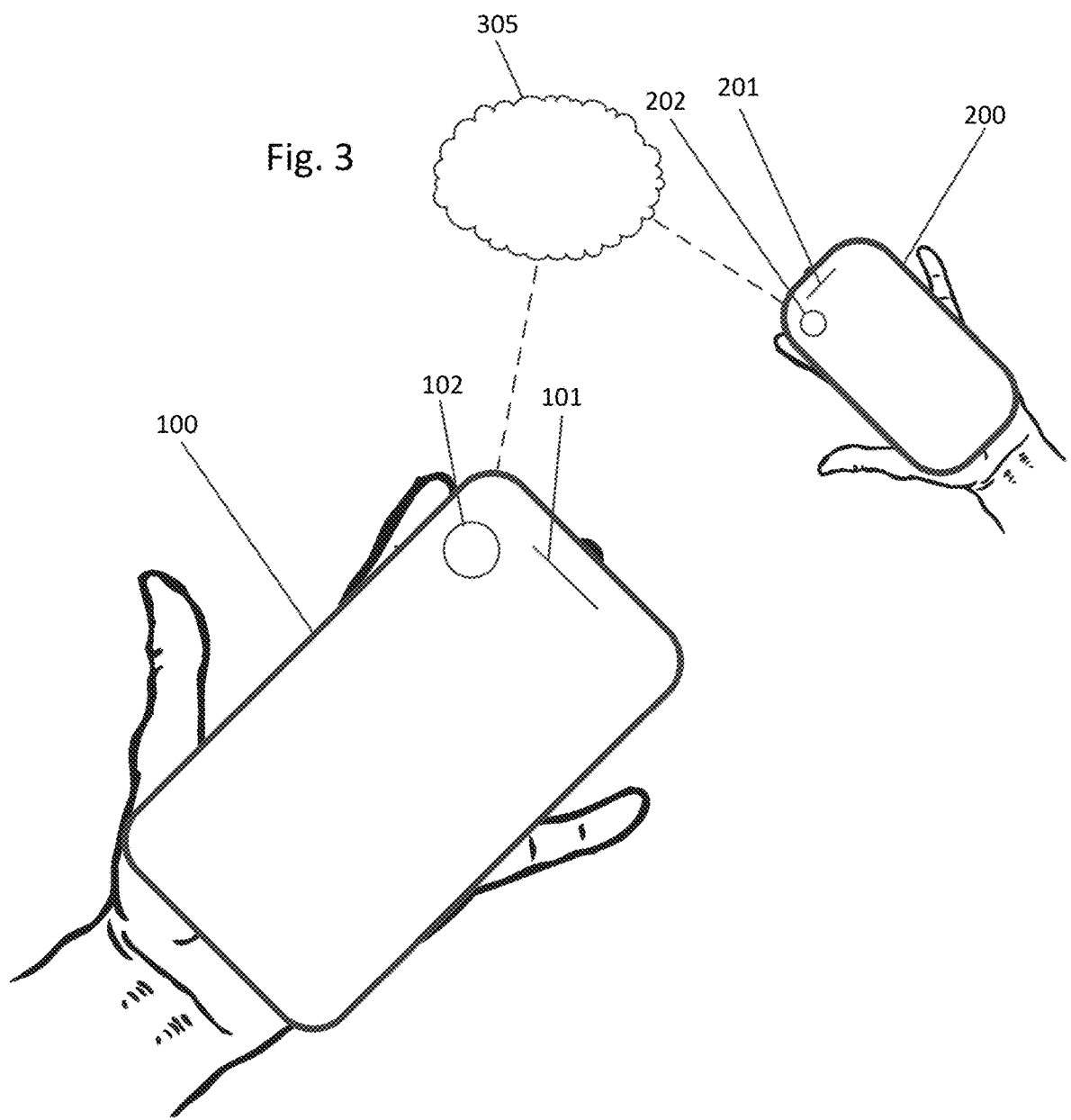
FIG. 3 is a view showing how a cellular connection may be instituted after an initial wireless connection has been made between an insinuating wireless device and a terminating wireless device, MINs have been exchanged, contacts have been created, and the internet connection has concluded.
Figure 4:
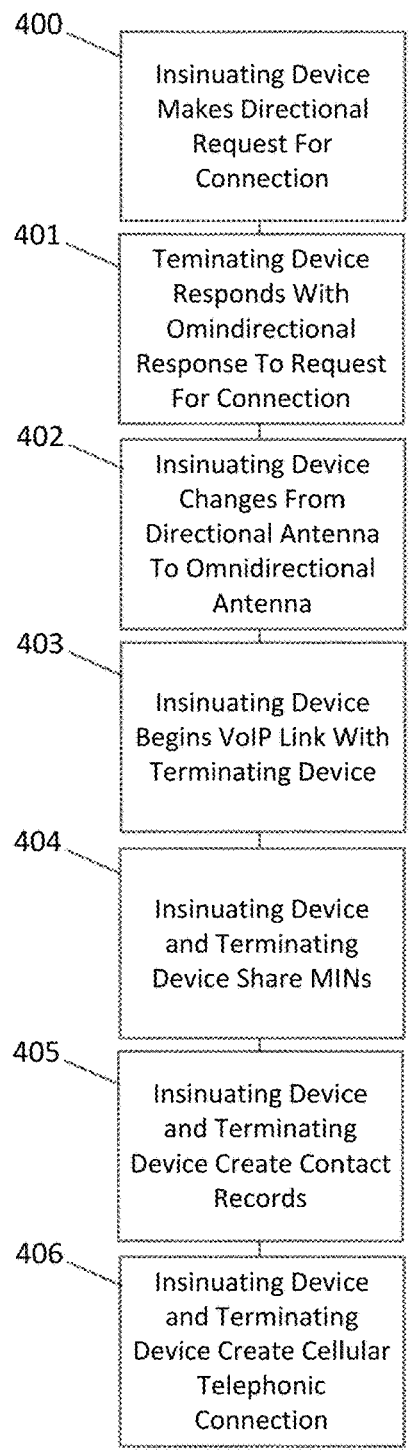
FIG. 4 is a flowchart showing how an insinuating wireless device creates a directional connection that is altered to an omnidirectional connection; MINs are exchanged; and contact records are created. By this means a conventional cellular telephone call may be placed after a directionally oriented connection has been made between an insinuating wireless device and a terminating wireless device, MINs have been exchanged, contacts have been created, and the directionally oriented connection has concluded.

Referring now to FIG. 3, if insinuating wireless device 100 and the terminating wireless device 200 have created contacts it will also be possible for the two devices to communicate using standard cellular network 305. In this mode, the initiator accesses the contact record containing the MIN that was received after the non-cellular bidirectional wireless connection 303 (the second wireless service) was completed and attempts to connect to it using standard cellular network 305.

Referring now to FIGS. 1 through 4, one embodiment of the system works in the following manner: Insinuating wireless device 100 is pointed so that its physical long axis is directed towards the terminating wireless device 200. Assuming its directional transmission facility 101 is oriented to transmit along the device's physical long axis, the insinuating wireless device 100 transmits a connection invitation towards the omnidirectional antenna 202 of the intended terminating wireless device 200 (400).

Assuming the terminating wireless device 200 allows connection invitations to be received, the terminating wireless device 200 may institute a connection with the insinuating wireless device 100. Whether the terminating wireless device 200 does so or not, is governed by the user of the terminating wireless device 200. The user of the terminating wireless device 200 is queried by a display screen on their device advising them that an insinuating wireless device 100 is attempting to make a connection. If the user of the terminating wireless device 200 selects not to create a connection with the insinuating wireless device 100, the terminating wireless device 200 communicates back a negative response and the insinuating wireless device 100 shows a screen to its user indicating that the user of the terminating wireless device 200 does not desire that the requested connection be made. On the other hand, if the user of the terminating wireless device 200 selects to create a connection with the insinuating wireless device 100, the terminating wireless device 200 communicates back a positive response and the insinuating wireless device 100 shows a screen to its user indicating that the user of the terminating wireless device 200 desires that the requested connection be made (401).

Next, the insinuating wireless device 100 changes from its directional transmission facility 101 to its omnidirectional antenna 102 and two-way, omnidirectional communication between the insinuating wireless device 100 and the terminating wireless device 200 begins (402).

Next, insinuating wireless device 100 and terminating wireless device 200 preferably begin a VoIP link between the two devices. Those having skill in the art will recognize that other communications protocols and applications can take advantage of the link between the two devices. For example, short message service (SMS) text messages and multimedia messaging service (MMS) messages, etc. also may be initiated and may occur. Similarly, data communication such as FTP and HTML may also occur (403).

Next, the insinuating wireless device 100 and the terminating wireless device 200 may, or may not, request that the insinuating wireless device 100 and the terminating wireless device 200 exchange mobile identification numbers (MINs). If the insinuating wireless device 100 and the terminating wireless device 200 agree to exchange MINs, they do so. Similarly, the insinuating wireless device 100 and the terminating wireless device 200 may, or may not, request that the insinuating wireless device 100 and the terminating wireless device 200 exchange IP or MAC addresses. If the insinuating wireless device 100 and the terminating wireless device 200 agree to exchange IP or MAC addresses, they do so (404).

One, or both, of the insinuating wireless device 100 and the terminating wireless device 200 may create contacts containing the MIN or the IP or MAC address reflecting the identity of the party with whom the connection has just been negotiated. Those having skill in the art will recognize that those newly created contacts will be stored in a contact database on the insinuating wireless device 100 and the terminating wireless device 200 (405).

Similarly, if the insinuating wireless device 100 and the terminating wireless device 200 have created contacts it will be possible for the two devices to communicate using a standard cellular or IP network. In this mode, the initiator accesses the contact record containing the MIN or the IP or MAC address that was received after the initial connection was completed and attempts to connect to it using a standard cellular network 305 or a standard IP network 306 (406).

Figure 5:
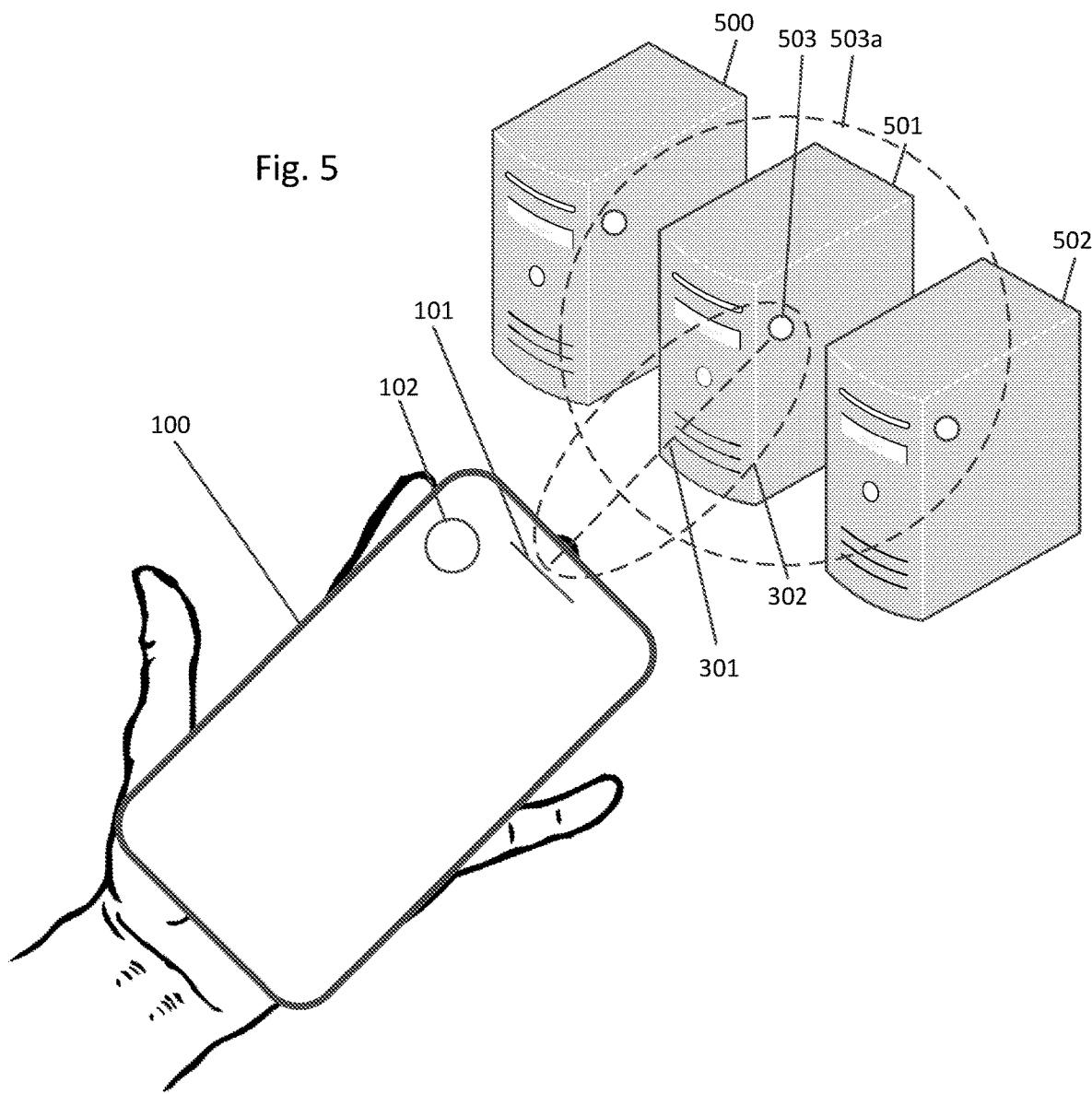
FIG. 5 is a view of an insinuating wireless device and how it is oriented when attempting to solicit an identifying connection from a terminating wireless serving device chosen from a multiplicity of wireless serving devices using an initial wireless connection.

Turning now to FIG. 5, in one embodiment of the present invention, the directionally oriented wireless telecommunications facility is used to create bidirectional communication link 301 (the first wireless service) from an insinuating wireless device 100 to a terminating wireless server device 501 selected from a multiplicity of other wireless server devices, e.g., 500 and 502.

Bidirectional communication link 301 (the first wireless service) directionally orients RF or infrared field 302 from the horizontal forward leading edge of insinuating wireless device 100. That is to say, that the long axis of insinuating wireless device 100 is collinear with bidirectional communication link 301 (the first wireless service) along which directionally oriented RF or infrared field 302 is created. Those having skill in the art will, of course, recognize that any other axis of insinuating wireless device (e.g., transverse and rear) 100 may also be used.

Those having skill in the art will recognize that directional transmission facility 101 may be of any construction, including but not limited to: a directional micro strip antenna, a Yagi antenna, a parabolic antenna, or a directional infrared emitter.

In the first phase of the connection sequence, insinuating wireless device 100 creates an RF or infrared field 302 generally oriented along bidirectional communication link 301 (the first wireless service).

Insinuating wireless device 100 continually transmits a connection request through RF or infrared field 302 oriented along bidirectional communication link 301 (the first wireless service). Potential terminating wireless server device 501 receives the connection request by means of omnidirectional antenna 503 with omnidirectional field 503*a*, and, optionally, determines whether the connection request is valid or transmitted from a valid insinuating device. Assuming the connection request is determined to be valid, terminating wireless server device 501 transmits an acceptance of the connection request. This acceptance of the connection request is received by directional transmission facility 101 of insinuating wireless device 100. Those having skill in the art will recognize that alternately omnidirectional antenna 102 may be used to receive the acceptance of the connection request.

After the acceptance of the connection request has been received, insinuating wireless device 100 may transmit data to terminating wireless server device 501 using any digital format. Terminating wireless server device 501 may run a speech-to-text transmission facility and a natural language analysis facility which receives and processes voice commands from insinuating wireless device 100. Such commands may be associated with: 1) Wireless voice communication and command between a smartphone or tablet computer and computer servers from a distance; 2) Faster data access and analysis through voice command from a distance; 3) Faster troubleshooting of computer servers and mainframes through voice command from a distance; and, 4) Voice command with multiple computer servers simultaneously.

After the initial communications link has been made, IP or MAC addresses are exchanged between insinuating wireless device 100 and terminating wireless server device 501 and stored.

Figure 6:
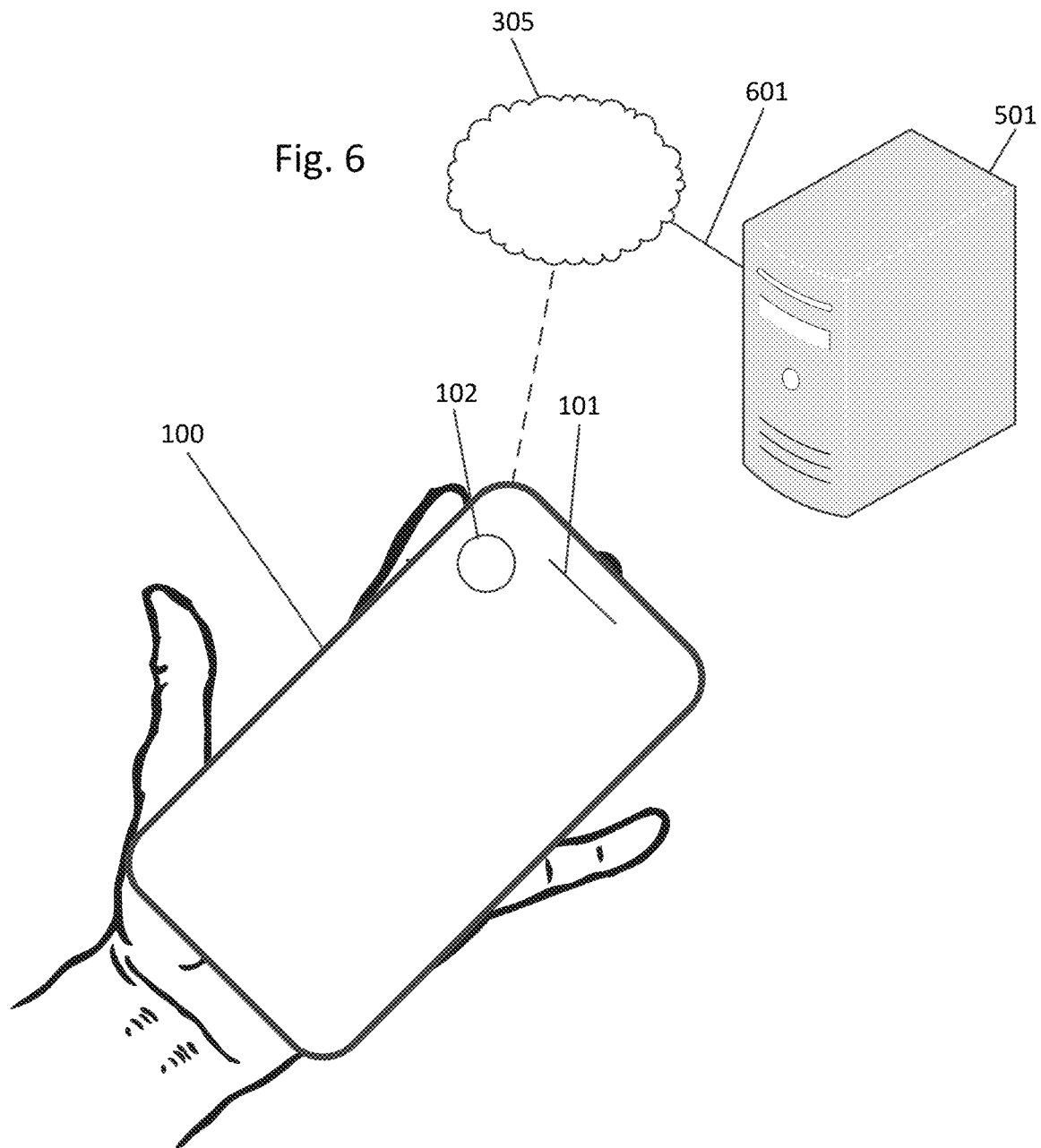
FIG. 6 is a view showing how an IP connection may be instituted after a directionally oriented identifying connection has been made between an insinuating wireless device and a terminating wireless device after IP or MAC addresses have been exchanged and the directionally oriented identifying connection has concluded.

Turning now to FIG. 6, at a subsequent time, insinuating wireless device 100 and terminating wireless server device 501 may reestablish a data connection using any IP network 306. Terminating wireless server device 501 is connected to the internet by means of a wireless or a wired link 601.

While specific devices and protocols have been referenced in the specification, those having skill in the art will recognize that all obvious variants are included by reference.

What is claimed is:

1. A method of instituting an omnidirectional wireless internet connection using a directional communications service in which:
   a) a first user operated insinuating wireless device directionally transmits a non-network transported connection request using a first wireless communication service by means of a directional antenna directly to a second user operated terminating wireless device;
   b) the terminating wireless device omnidirectionally transmits an acceptance of the connection request using a wireless communication service by means of an omnidirectional antenna back to the insinuating wireless device; and
   c) the insinuating and terminating wireless devices both change to the second wireless communications service and initiate communications using omnidirectional antennas.

2. The method of instituting an omnidirectional wireless internet connection using a directional communications service of claim 1 wherein mobile identification numbers (MINs) are exchanged between the insinuating wireless device and the terminating wireless device.

3. The method of instituting an omnidirectional wireless internet connection using a directional communications service of claim 2 wherein each of the mobile identification numbers (MINs) shared between the insinuating wireless device and the terminating wireless device are memorialized as contacts in a contact database.

4. The method of instituting an omnidirectional wireless internet connection using a directional communications service of claim 3 wherein a MIN is subsequently retrieved by an insinuating wireless device and a cellular telephone call is made to a terminating wireless device.

5. The method of instituting an omnidirectional wireless internet connection using a directional communications service of claim 1 wherein identifying IP addresses are exchanged between the insinuating wireless device and the terminating wireless device.

6. The method of instituting an omnidirectional wireless internet connection using a directional communications service of claim 5 wherein the IP addresses are shared between the insinuating wireless device and the terminating wireless device and are memorialized as contacts in a contact database.

7. The method of instituting an omnidirectional wireless internet connection using a directional communications service of claim 6 wherein an IP address derived from a database is subsequently retrieved by an insinuating wireless device and a data connection is made to a terminating wireless device.

8. The method of instituting an omnidirectional wireless internet connection using a directional communications service of claim 1 wherein Media Access Control (MAC) addresses are exchanged between the insinuating wireless device and the terminating wireless device by means of the first communication service.

9. The method of instituting an omnidirectional wireless internet connection using a directional communications service of claim 8 wherein the MAC addresses are shared between the insinuating wireless device and the terminating wireless device and are memorialized as contacts in a contact database.

10. The method of instituting an omnidirectional wireless internet connection using a directional communications service of claim 9 wherein a MAC address derived from a contact is subsequently retrieved by an insinuating wireless device and a data connection is made to a terminating wireless device by means of an omnidirectional antenna operating on a second wireless communication service.

11. The method of instituting an omnidirectional wireless internet connection using a directional communications service of claim 1 wherein Media Access Control (MAC) addresses are exchanged between the insinuating wireless device and the terminating wireless device by means of the second wireless communication service.

12. The method of instituting an omnidirectional wireless internet connection using a directional communications service of claim 11 wherein the MAC addresses are shared between the insinuating wireless device and the terminating wireless device and are memorialized as contacts in a contact database.

13. The method of instituting an omnidirectional wireless internet connection using a directional communications service of claim 12 wherein a MAC address derived from a contact is subsequently retrieved by an insinuating wireless device and a data connection is made to a terminating wireless device by means of an omnidirectional antenna operating on a second wireless communication service.

14. The method of instituting an omnidirectional wireless internet connection using a directional communications service of claim 1 wherein the second wireless internet connection is Bluetooth.

15. The method of instituting an omnidirectional wireless internet connection using a directional communications service of claim 1 wherein the second wireless internet connection is Long Term Evolution (LTE).

16. The method of instituting an omnidirectional wireless internet connection using a directional communications service of claim 1 wherein the second wireless internet connection is Worldwide Interoperability for Microwave Access (WiMAX).

17. The method of instituting an omnidirectional wireless internet connection using a directional communications service of claim 1 wherein the second wireless internet connection is Wi-Fi.

18. The method of instituting an omnidirectional wireless internet connection using a directional communications service of claim 1 wherein the second wireless internet connection is EDGE Evolution.

19. The method of instituting an omnidirectional wireless internet connection using a directional communications service of claim 1 wherein the second wireless internet connection is Universal Mobile Telecommunications System (UMTS).

20. The method of instituting an omnidirectional wireless internet connection using a directional communications service of claim 1 wherein the second wireless internet connection is Evolution-Data Optimized (EV-DO).

21. The method of instituting an omnidirectional wireless internet connection using a directional communication service of claim 1 wherein the second wireless internet connection is Wireless Application Protocol (WAP) 2.0.

22. The method of instituting an omnidirectional wireless internet connection using a directional communication service of claim 1 wherein the second wireless internet connection is Flash Orthogonal frequency-division multiplexing (Flash-OFDM).

23. The method of instituting an omnidirectional wireless internet connection using a directional communication service of claim 1 wherein the second wireless internet connection is iBurst.

24. The method of instituting an omnidirectional wireless internet connection using a directional communications service of claim 1 wherein the second wireless internet connection is used to create a VoIP connection.

25. A method of instituting an omnidirectional wireless internet connection using a directional communications service in which:
   a) a first user operated insinuating wireless device is manually pointed in the direction of a second user operated terminating wireless device;
   b) the insinuating wireless device directionally transmits a non-network transported connection request using first wireless communication service by means of a directional antenna to the terminating wireless device;
   c) the terminating wireless device omnidirectionally transmits an acceptance of the connection request by means of an omnidirectional antenna back to the insinuating wireless device; and
   d) the insinuating and terminating wireless devices change to a second wireless communications service and initiate communications using omnidirectional antennas.

26. The method of instituting an omnidirectional wireless internet connection using a directional communications service of claim 25 in which the directional antenna conveys an infrared transmission service.

* * * * *